(12) United States Patent
Bang

(10) Patent No.: US 12,469,525 B2
(45) Date of Patent: Nov. 11, 2025

(54) MEMORY DEVICE AND METHOD OF SEARCHING FOR OPTIMUM CALIBRATION CODE CORRESPONDING TO CURRENT PVT USING LOOK-UP TABLE

(71) Applicant: Samsung Electronics Co., Ltd., Suwon-si (KR)

(72) Inventor: Jongmin Bang, Suwon-si (KR)

(73) Assignee: Samsung Electronics Co., Ltd., Gyconggi-do (KR)

( * ) Notice: Subject to any disclaimer, the term of this patent is extended or adjusted under 35 U.S.C. 154(b) by 45 days.

(21) Appl. No.: 18/398,930

(22) Filed: Dec. 28, 2023

(65) Prior Publication Data

US 2024/0221796 A1  Jul. 4, 2024

(30) Foreign Application Priority Data

Dec. 29, 2022 (KR) .......................... 10-2022-0189381

(51) Int. Cl.
 *G11C 7/10* (2006.01)
(52) U.S. Cl.
 CPC .... *G11C 7/1048* (2013.01); *G11C 2207/2254* (2013.01)
(58) Field of Classification Search
 CPC ............ G11C 7/1048; G11C 11/40626; G11C 2207/2254; G11C 7/12
 See application file for complete search history.

(56) References Cited

U.S. PATENT DOCUMENTS

| | | | |
|---|---|---|---|
| 7,710,143 B2 | 5/2010 | Jeong et al. | |
| 8,411,517 B2 | 4/2013 | Choi | |
| 9,666,245 B2 | 5/2017 | Arai et al. | |
| 2008/0252332 A1* | 10/2008 | Lee | H03K 19/0002 326/30 |
| 2008/0284467 A1* | 11/2008 | Koo | H04L 25/0278 326/30 |
| 2009/0115449 A1* | 5/2009 | Kim | G11C 7/1051 326/30 |

(Continued)

FOREIGN PATENT DOCUMENTS

| | | |
|---|---|---|
| KR | 10-2010-0029954 A | 3/2010 |
| KR | 101605463 B1 | 3/2016 |

*Primary Examiner* — Han Yang
(74) *Attorney, Agent, or Firm* — Harness, Dickey & Pierce, P.L.C.

(57) ABSTRACT

Provided is a memory device including a temperature to code (T2C) converter configured to obtain temperature data, to obtain specification voltage data, to determine a calibration code corresponding to the obtained temperature and specification voltage data, and configured to transmit information about the determined calibration code to a code generator, the code generator configured to transmit the generated calibration code to a pull-down/up set circuit, the pull-down/up set circuit configured to determine opening and closing of a plurality of transistors to correspond to the calibration code received from the code generator, and configured to form a pull-down/up impedance, and a comparator configured to compare a magnitude of a first input voltage and the impedance of an on-die termination (ODT) circuit with a magnitude of a second input voltage and configured to transmit a calibration code change signal to the code generator based on a result of the voltage comparison.

20 Claims, 11 Drawing Sheets

(56) References Cited

U.S. PATENT DOCUMENTS

2014/0368249 A1    12/2014   Lee
2015/0333753 A1    11/2015   Chen et al.
2017/0123446 A1     5/2017   Siddula et al.

* cited by examiner

FIG. 5

| $V_{OH} = V_{DDQ} \times \frac{1}{3}$ | | $V_{OH} = V_{DDQ} \times \frac{1}{2}$ | | ... |
|---|---|---|---|---|
| $T_{code}$ | $ZQ_{code}$ | $T_{code}$ | $ZQ_{code}$ | ... |
| 000.. | 010.. | 000.. | 010.. | ... |
| 001.. | 011.. | 001.. | 011.. | ... |
| 010.. | 101.. | 010.. | 101.. | ... |
| 011.. | 110.. | 011.. | 110.. | ... |
| ... | ... | ... | ... | ... |

MEMORY DEVICE AND METHOD OF SEARCHING FOR OPTIMUM CALIBRATION CODE CORRESPONDING TO CURRENT PVT USING LOOK-UP TABLE

CROSS-REFERENCE TO RELATED APPLICATION

This application is based on and claims priority under 35 U.S.C. § 119 to Korean Patent Application No. 10-2022-0189381, filed on Dec. 29, 2022, in the Korean Intellectual Property Office, the disclosure of which is incorporated by reference herein in its entirety.

BACKGROUND

The inventive concepts relate to semiconductor integrated circuits, and more particularly, to an improved or optimal calibration code search method corresponding to current process, voltage, and temperature (PVT) using a look-up table and a memory device that employs the optimal calibration code search method.

An electronic device includes a plurality of semiconductor integrated circuits (or semiconductor chips), and thus, its hardware configuration becomes complicated. In response to the demand for miniaturization and/or weight lightening of electronic devices, a multi-chip package in which multiple semiconductor chips are mounted in one package is provided to reduce the number of mounted parts. In addition, in order to reduce or minimize the transmission time of signals interfaced between semiconductor chips, the swing width of the signals is decreasing. As the swing width of signals decreases, external noise has a greater impact on semiconductor chips, and signal reflection caused by impedance mismatch becomes more serious at the interface. Semiconductor chips are equipped with ZQ pins and receive external ZQ calibration commands to perform ZQ calibration operations to control impedance matching to solve impedance mismatch.

In accordance with the trend of higher-capacity memory demands, a multi-chip package is provided in which multiple memory chips (or dies) operating independently through different channels are mounted within one package. In a multi-chip package channel, each of the memory chips performs a ZQ calibration operation on signal lines that transmit commands, addresses, and data of a corresponding memory chip. In some example embodiments, the ZQ calibration operation should be performed as many as the number of memory chips mounted in the multi-chip package. For example, when eight memory chips are mounted in a multi-chip package, eight ZQ calibration operations should be performed, and the multi-chip package has to complete the ZQ calibration operation during the ZQ calibration time specified in the standard specification.

It may take a lot of time to perform the ZQ calibration operation on each chip, which is a factor that reduces the operating speed of the semiconductor, and accordingly, the time required for the calibration operation should be advantageously shortened. The code to be found through calibration may be greatly influenced by a process, voltage, and/or temperature (PVT).

SUMMARY

The inventive concepts provide a method of shortening calibration time using a process, voltage, and temperature (PVT) look-up table obtained through simulation and evaluation data.

According to an aspect of the inventive concepts, there is provided a memory device including a temperature to code (T2C) converter configured to obtain temperature data from a temperature sensor, configured to obtain specification voltage data from a mode register write (MRW) module, configured to determine a calibration code corresponding to the obtained temperature data and specification voltage data based on a stored look-up table, and configured to transmit code data including information about the determined calibration code to a code generator, the code generator configured to transmit the generated calibration code to a pull-down/up set circuit, based on the code data received from the T2C converter, the pull-down/up set circuit configured to determine opening and closing of a plurality of transistors to correspond to the calibration code received from the code generator, and configured to form a pull-down/up impedance, and a comparator configured to compare a magnitude of a first input voltage determined by the pull-down/up impedance and the impedance of an on-die termination (ODT) circuit with a magnitude of a second input voltage generated by a voltage generator and transmit a calibration code change signal to the code generator based on a result of the voltage comparison.

According to another aspect of the inventive concepts, there is provided a memory device including a temperature to code (T2C) converter configured to acquire temperature data and specification voltage data from an temperature sensor and a mode register write (MRW) module, respectively, a comparator configured to receive an input voltage from an on-die termination (ODT) circuit and a pull-down/up set circuit, configured to receive a power source voltage, and an input voltage from a voltage generator, and a calibration control circuit electrically connected to the T2C converter and the comparator, wherein the calibration control circuit may be configured to generate a start calibration code by using a look-up table stored in the T2C converter, determine whether to open and close a plurality of transistors included in the pull-down/up set circuit to correspond to the start calibration code, and determine an increase or a decrease of the calibration code by using the comparator.

According to another aspect of the inventive concepts, there is provided a calibration method using a memory device including a temperature to code (T2C) converter, the calibration method including acquiring temperature data, acquiring specification voltage data, and determining, by the T2C converter, a calibration code corresponding to the obtained temperature data and specification voltage data based on a stored look-up table, transmitting code data including information on the determined calibration code to a code generator, generating a calibration code by the code generator and transmitting the generated calibration code to a pull-down/up set circuit, determining opening and closing of a plurality of transistors to correspond to the calibration code in the pull-down/up set circuit to form a pull-down/up impedance, and comparing a magnitude of a first input voltage determined by the pull-down/up impedance and the impedance of an on-die termination (ODT) circuit with a magnitude of a second input voltage generated by a voltage generator and transmitting a calibration code change signal to the code generator based on a result of the voltage comparison.

By shortening the calibration time, the operating speed of a semiconductor chip may be increased.

BRIEF DESCRIPTION OF THE DRAWINGS

Example embodiments of the inventive concepts will be more clearly understood from the following detailed description taken in conjunction with the accompanying drawings in which:

FIG. 5 illustrates a look-up table stored in a T2C converter according to example embodiments of the inventive concepts;

DETAILED DESCRIPTION OF EXAMPLE EMBODIMENTS

Hereinafter, example embodiments of the inventive concepts will be described in detail with reference to the accompanying drawings.

Figure 1:
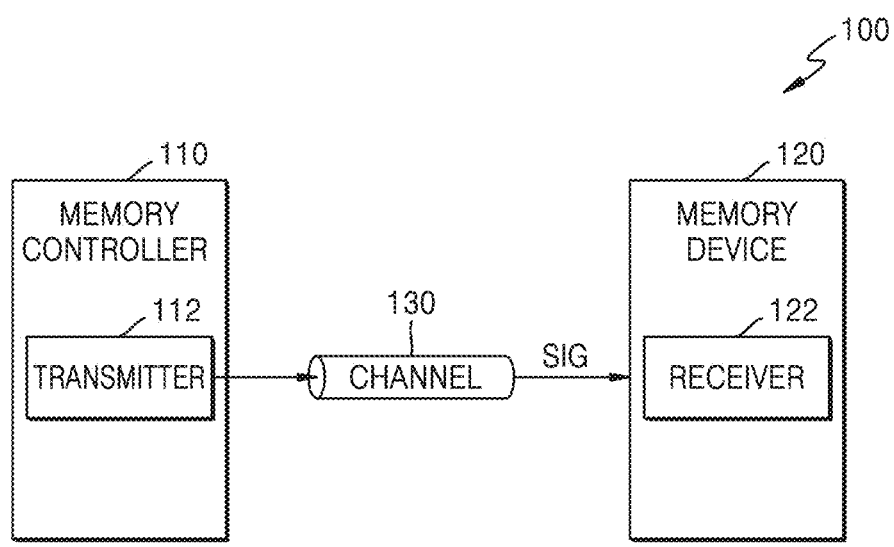
FIG. 1 is a block diagram illustrating a memory system according to example embodiments of the inventive concepts.

FIG. 1 is a block diagram illustrating a memory system according to example embodiments of the inventive concepts.

Referring to FIG. 1, a memory system 100 may include a memory controller 110 and a memory device 120. The memory system 100 may be implemented to be included in a personal computer (PC) or a mobile electronic device. Signals may be transmitted between the memory controller 110 and the memory device 120 through a channel 130. The channel 130 may be a signal line that physically or electrically connects the memory controller 110 with the memory device 120. For example, the memory controller 110 and the memory device 120 may be connected to one another according to a memory interface protocol defined in the Toggle standard. However, the inventive concepts are not limited thereto, and the memory controller 110 and the memory device 120 may be connected to one another according to other standard interfaces.

For example, the interface connecting the memory controller 110 with the memory device 120 may be implemented in various interface schemes such as an Advanced Technology Attachment (ATA) interface, Serial ATA (SATA) interface, an External SATA (e-SATA) interface, a Small Computer Small Interface (SCSI) interface, a Serial Attached SCSI (SAS) interface, a Peripheral Component Interconnection (PCI) interface, a PCI express (PCIe) interface, an NVM express (NVMe) interface, an IEEE 1394 interface, a Universal Serial Bus (USB) interface, a Secure Digital (SD) card, a multi-media card (MMC) interface, an embedded multi-media card (eMMC) interface, a Universal Flash Storage (UFS) interface, an embedded Universal Flash Storage (eUFS) interface, a Compact Flash (CF) card interface, and the like.

Referring back to FIG. 1, the channel 130 may be coupled to each pin of the memory controller 110 and the memory device 120 at each end of the channel 130. The term "pin" broadly refers to an electrical interconnection to an integrated circuit, and may include, for example, a pad or other electrical contact point on the integrated circuit. For the simplicity of the drawing, it is shown that signals are transmitted through one signal line between the memory controller 110 and the memory device 120, but signals may actually be transmitted through signal lines or buses.

The memory controller 110 may include a transmitter 112, and the transmitter 112 may transmit an output signal SIG to the memory device 120 through the channel 130. The transmitter 112 may transmit an output signal SIG, including serialized bits, to a receiver 122 through the channel 130. The memory device 120 may include the receiver 122, and the receiver 122 may receive the output signal SIG transmitted through the channel 130. The receiver 122 may be configured to perform an operation corresponding to the function of the output signal SIG in a semiconductor device including the receiver 122.

In some example embodiments, the memory system 100 may be an internal memory embedded in an electronic device. For example, the memory system 100 may be a solid state drive (SSD), an embedded UFS memory device, or an eMMC. In some example embodiments, the memory system 100 may be an external memory detachable from an electronic device. For example, the memory system 100 may be a UFS memory card, CF card, an SD card, a Micro-SD card, a Mini-SD card, an Extreme Digital (xD), or Memory Stick.

In some example embodiments, the memory controller 110 may be implemented as a memory device. The memory device may be implemented as a non-volatile memory device or a volatile memory device. The non-volatile memory device may include, as a non-limiting example, a flash memory, phase change random access memory (PRAM), resistance random access memory (RRAM), magnetic random access memory (MRAM), ferroelectric random access memory (FRAM), electrically erasable programmable read-only memory (EEPROM), nano floating gate memory (NFGM), polymer random access memory (PoRAM), or the like. The volatile memory device may include, as a non-limiting example, Dynamic Random Access Memory (DRAM), Static Random Access Memory (SRAM), Mobile Dynamic Random Access Memory (DRAM), Double Data Rate Synchronous Dynamic Random Access Memory (DDR SDRAM), Low Power DDR (LPDDR) SDRAM, Graphics DDR (GDDR) SDRAM, Rambus Dynamic Random Access Memory (RDRAM), High Bandwidth Efficient Memory (HBM), or the like.

In some configurations, the memory controller 110 may be implemented as an integrated circuit (IC), a System on Chip (SoC), an Application Processor (AP), a mobile AP, a chipset, or a set of chips. The AP may include a memory controller, RAM, a central processing unit (CPU), a graphics processing unit (GPU), and/or a modem.

The memory controller 110 may read data stored in the memory device 120 or control to write data to the memory device 120, in response to a write/read request of a host. The memory controller 110 may control a data writing and/or reading operation for the memory device 120 by providing a clock signal, a command signal, and/or an address signal to the memory device 120. The memory device 120 may receive clock signals, command signals, and/or address signals from the memory controller 110 and generate internal signals corresponding to the functions of the received clock signals, command signals, and/or address signals. The memory device 120 may perform memory operations such as selecting rows and columns corresponding to memory cells, writing data to memory cells, or reading written data from the memory cells according to the internal signal.

Figure 2:
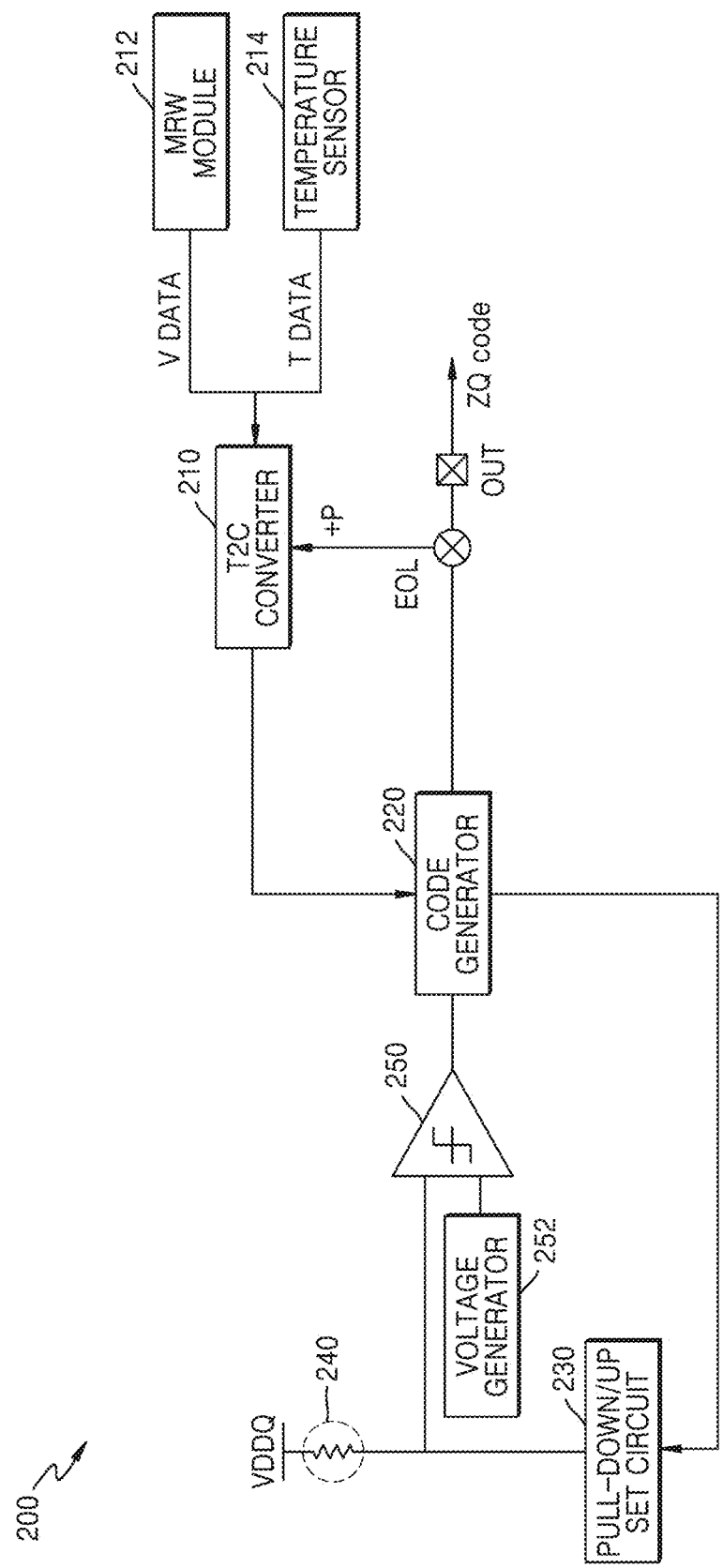
FIG. 2 illustrates an impedance calibration circuit of a memory device according to example embodiments of the inventive concepts.

FIG. 2 illustrates an impedance calibration circuit of a memory device according to example embodiments of the inventive concepts. The inventive concepts are not limited to being used only for performing impedance calibration, and may be generally used for calibration operations using a variety of data. For example, example embodiments of performing impedance matching (e.g., ZQ calibration) are described in the present specification.

Figure 9:
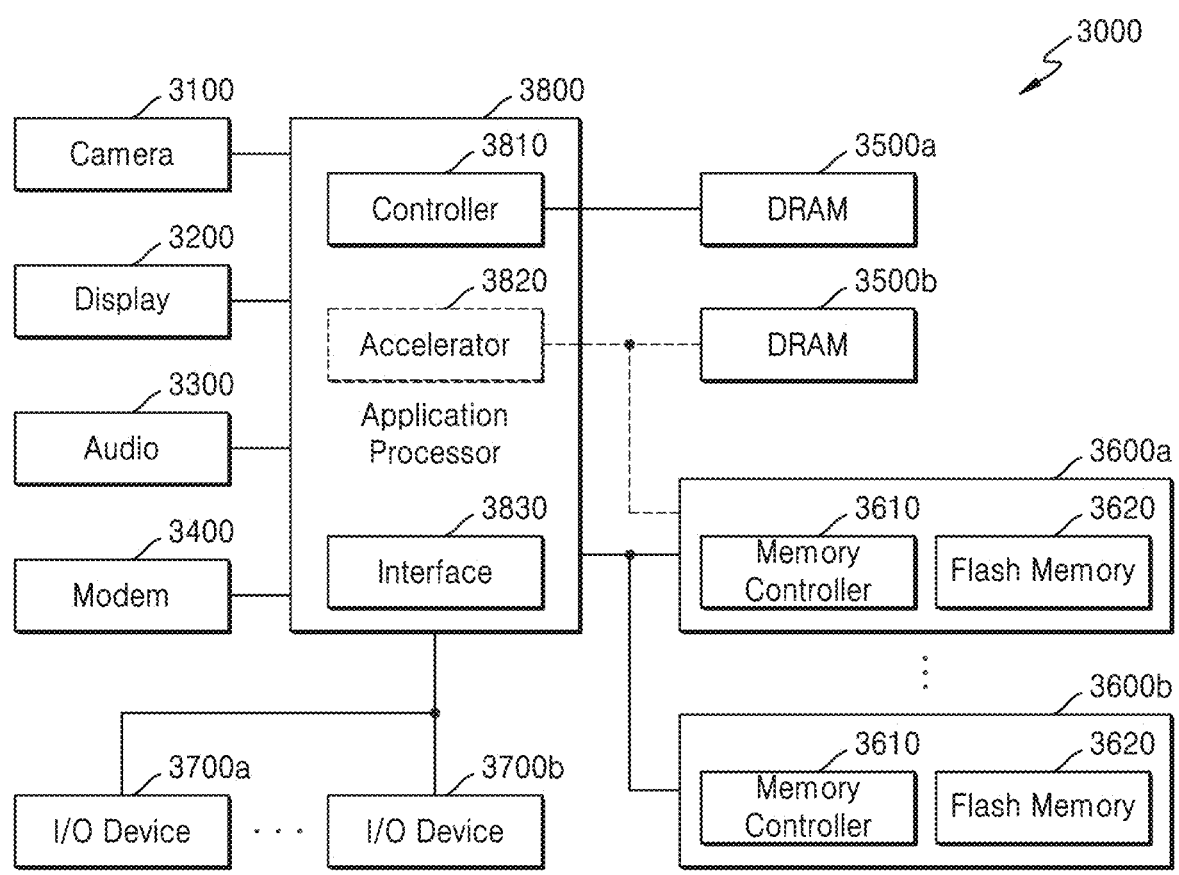
FIG. 9 is a block diagram illustrating a system including a memory device including a device for performing a calibration method according to example embodiments of the inventive concepts.

An impedance calibration circuit 200 may include a temperature sensor 214, a mode register write (MRW) module 212, a temperature to code (T2C) converter 210, a code generator 220, a pull-down/up set circuit 230, and a comparator 250. The impedance calibration circuit 200 may provide a termination impedance with a target impedance value to an output terminal OUT using an external resistor (an on-die termination circuit 240). The impedance calibration circuit 200 may be implemented in a device that requires a termination impedance with a specific impedance value at the output terminal OUT. For example, the impedance calibration circuit 200 may be implemented in a memory device and the like as shown in FIG. 9.

The impedance calibration circuit 200 may be electrically connected to the on-die termination circuit 240. The on-die termination circuit 240 refers to an impedance arranged for signal integrity (SI). The impedance calibration circuit 200 and the on-die termination circuit 240 may perform impedance calibration (or perform impedance-matching) to generate an impedance required for SI of the memory device. The impedance calibration circuit 200 may search for an appropriate digital code to generate an impedance for impedance matching.

The temperature sensor 214 may check the temperature of the impedance calibration circuit 200 to generate temperature (T) data indicating the temperature of the impedance calibration circuit 200. The temperature sensor 214 may transmit the generated T data to the T2C converter 210. According to example embodiments, the temperature sensor 214 may update T data every predetermined or alternatively, desired cycle and transmit the updated T data to the T2C converter 210. According to example embodiments, when a predetermined or alternatively, desired event occurs, the temperature sensor 214 may update the T data and transmit the updated T data to the T2C converter 210. For example, when the variation of the temperature of the impedance calibration circuit 200 is greater than a predetermined or alternatively, desired unit temperature (e.g., 1 degree Celsius), the temperature sensor 214 may transmit the updated T data to the T2C converter 210.

The MRW module 212 may perform an operation of inputting information of a mode set in a register. The MRW module 212 may check the specification voltage of the memory device and generate voltage (V) data indicating the specification voltage. The MRW module 212 may transmit the generated V data to the T2C converter 210. The MRW module 212 may change V data by receiving an external input. For example, when the specification voltage is changed from $V_{OH}=\frac{1}{2}V_{DD}$ to $V_{OH}=\frac{1}{3}V_{DD}$, the MRW module 212 may generate V data reflecting the changed specification voltage. In response to confirming that the specification voltage is changed, the MRW module 212 may transmit V data reflecting the changed specification voltage to the T2C converter 210. According to example embodiments, the T2C converter 210 may obtain V data through a voltage sensor. The voltage sensor may acquire V data by sensing a specification voltage of the current memory device and transmit the obtained V data to the T2C converter 210.

The T2C converter 210 may store a look-up table in its own memory. The look-up table may be a table that is obtained by mapping any combination of P data, V data, and T data representing a process variation of a memory chip, to a calibration code corresponding thereto. According to example embodiments, the T2C converter 210 may include a plurality of look-up tables corresponding to various process variations of the memory chip. According to example embodiments, the look-up table stored in the T2C converter 210 may include a first look-up table corresponding to a first process variation (first P data) of the memory chip, a second look-up table corresponding to a second process variation (second P data) of the memory chip, and a third look-up table corresponding to a third process variation (third P data) of the memory chip. The T2C converter 210 may select one look-up table from among the plurality of look-up tables based on an external input. For example, when a fusing signal is received from an external line connected to the impedance calibration circuit 200, the T2C converter 210 may select a look-up table corresponding to the fusing signal. The T2C converter 210 may use a look-up table selected to reflect the process variation of the memory chip according to the fusing signal when performing impedance calibration, but the example embodiments are not limited thereto. The T2C converter 210 may determine a start calibration code corresponding to T data obtained from the temperature sensor 214 and V data obtained from the MRW module 212 by referring to the look-up table. Hereinafter, a calibration code determined by the T2C converter 210 based on the T data and the V data is referred to as a start calibration code. The start calibration code determined by the T2C converter 210 may be a value determined near the target calibration code considering P, V, and T data. The T2C converter 210 may generate code data including information on the determined start calibration code and transmit the generated code data to the code generator 220.

The code generator 220 may check the code data received from the T2C converter 210 and generate a calibration code corresponding to the code data and transmit the generated calibration code to the pull-down/up set circuit 230. The code generator 220 may generate a calibration code having a predetermined or alternatively, desired bit size (e.g., 6). According to example embodiments, each digit of the calibration code may mean opening and closing of a plurality of transistors included in the pull-down/up set circuit 230.

The pull-down/up set circuit 230 includes the plurality of transistors connected in parallel with each other, and may determine the opening and closing of each transistor to generate a final impedance. Each of the transistors included in the pull-down/up set circuit 230 may have the same impedance or different impedances. The pull-down/up set circuit 230 may be connected to the on-die termination circuit 240 and may serve as a voltage divider of a power source voltage supplied to the on-die termination circuit 240. The voltage divided by the pull-down/up set circuit 230 and the on-die termination circuit 240 may be applied to the comparator 250 as a first input voltage. The voltage level applied to the first input voltage may be calculated by the following Equation 1.

$$V_{IN} = \frac{Z_{pull-down/up}}{Z_{pull-down/up} + Z_{ODT}} \times V_{DDQ} \qquad [\text{Equation 1}]$$

$V_{IN}$: First input voltage
$Z_{pull-down/up}$: Impedance of the pull-down/up set circuit 230
$Z_{ODT}$: Impedance of the on-die termination circuit 240
$V_{DDQ}$: Power source voltage The pull-down/up set circuit 230 may receive a calibration code from the code generator 220 and determine the opening and closing of the transistors in response to the calibration code. For example, when the number of transistors included in the pull-down/up set circuit 230 is six and the calibration code is 101011, the pull-down/up set circuit 230 may turn on the first transistor, the third transistor, the fifth transistor, and the sixth transistor, and may turn off the second transistor and the fourth transistor.

The comparator 250 may receive the first input voltage and the second input voltage, compare the magnitudes of the first input voltage and the second input voltage, and output a comparison result. As described above, the first input voltage is the voltage divided by the on-die termination circuit 240 and the pull-down/up set circuit 230, and the second input voltage is the voltage applied by the voltage generator 252. The voltage generator 252 may output a voltage corresponding to the specification voltage of the current memory device. For example, when the current specification voltage is $V_{OH}=\frac{1}{2}V_{DD}$, the voltage generator 252 may output a voltage corresponding to $\frac{1}{2}V_{DD}$.

The comparator 250 may transmit a calibration code decrease signal to the code generator 220 to reduce the calibration code when the first input voltage is greater than the second input voltage. Conversely, the comparator 250 may transmit a calibration code increase signal to the code generator 220 to increase the calibration code when the first input voltage is less than the second input voltage.

The code generator 220 may change the calibration code by a predetermined or alternatively, desired value (e.g., 1) in response to receiving a calibration code increase signal or a calibration code decrease signal from the comparator 250. For example, when the code generator 220 receives a calibration code increase signal, the code generator 220 may transmit, to the pull-down/up set circuit 230, the calibration code that is obtained by increasing the previous calibration code by a predetermined or alternatively, desired value. For example, when the code generator 220 receives a calibration code decrease signal, the code generator 220 may transmit, to the pull-down/up set circuit 230, the calibration code that is obtained by decreasing the previous calibration code by a predetermined or alternatively, desired value. The code generator 220 may continuously receive a calibration code increase signal or a calibration code decrease signal from the comparator 250 and change the calibration code.

When a predetermined or alternatively, desired event occurs, the code generator 220 may determine the current calibration code as a target calibration code. According to example embodiments, the code generator 220 may determine the current calibration code as the target calibration code when the calibration code increase signal or the calibration code decrease signal are sequentially received more than a predetermined or alternatively, desired number of times (or the calibration code toggles). For example, when the code generator 220 receives the calibration code increase signal or the calibration code decrease signal sequentially twice, the current calibration code may be determined as the target calibration code. For example, when the code generator 220 sequentially receives the first signal, the second signal, the third signal, and the fourth signal and the first signal is the calibration code increase signal, the second signal is the calibration code decrease signal, the third signal is the calibration code increase signal, and the fourth signal is the calibration code decrease signal, the code generator 220 may determine the calibration code at the time of receiving the fourth signal as the target calibration code.

The impedance calibration circuit 200 may operate as described above and search for a target calibration code. The target calibration code is a code that generates the impedance of the pull-down/up set circuit 230 suitable for the current P data, V data, and T data in impedance matching between a memory device and a memory controller. For example, when the current specification voltage is $V_{OH}=\frac{1}{2}V_{DD}$, and the target calibration code is input, the impedance of the pull-down/up set circuit 230 may be the same as the impedance of the on-die termination circuit 240. When the impedance calibration circuit 200 finds the target calibration code, the code generator 220 may no longer generate the code and transmit the target calibration code to the output terminal OUT.

According to example embodiments, the code generator 220 may transmit the determined target calibration code to the T2C converter 210. The T2C converter 210 may update the look-up table using the received target calibration code. According to example embodiments, the T2C converter 210 may change the look-up table to a look-up table corresponding to the current P data and other P data when the difference between the code value mapped to the current P, V, and T data in the look-up table and the target calibration code is outside a predetermined or alternatively, desired range.

Figure 3:
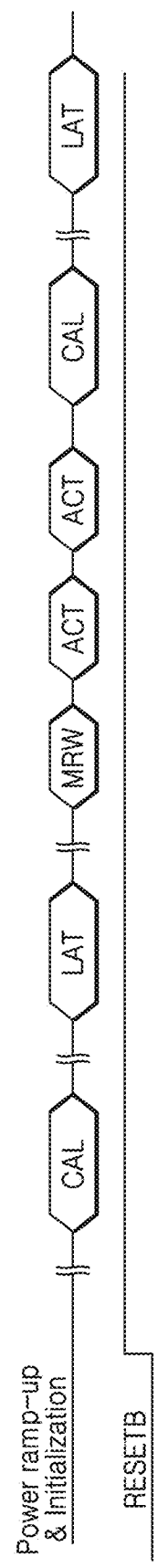
FIG. 3 is a timing diagram illustrating a sequence in which calibration is performed in a memory device according to example embodiments of the inventive concepts.

FIG. 3 is a timing diagram illustrating a sequence in which calibration is performed in a memory device according to example embodiments of the inventive concepts.

Referring to FIG. 3, the memory device may perform calibration for impedance matching in response to receiving a calibration start signal CAL. A temperature sensor and an MRW module may transmit T data and V data to a T2C converter in response to receiving the calibration start signal. Considering P, V, and T data, the T2C converter determines the start calibration code near the target calibration code and transmits code data to a code generator, in which the code generator may generate the calibration code and transmit the generated calibration code to a pull-down/up set circuit. A comparator may compare the first input voltage with the second input voltage and transmit a calibration code increase signal or a calibration code decrease signal to the code generator. The code generator may confirm that the calibration code is toggled and determine the current calibration code as a target calibration code. The code generator may transmit the target calibration code to an output terminal.

The memory device may apply a target calibration code in response to receiving a latch signal LAT. The memory device may perform a general operation (MRW signaling or ACT signaling) after using the target calibration code. The memory device may perform the calibration operation again after a predetermined or alternatively, desired time elapses or when a predetermined or alternatively, desired event occurs (CAL or LAT).

Figure 4A:
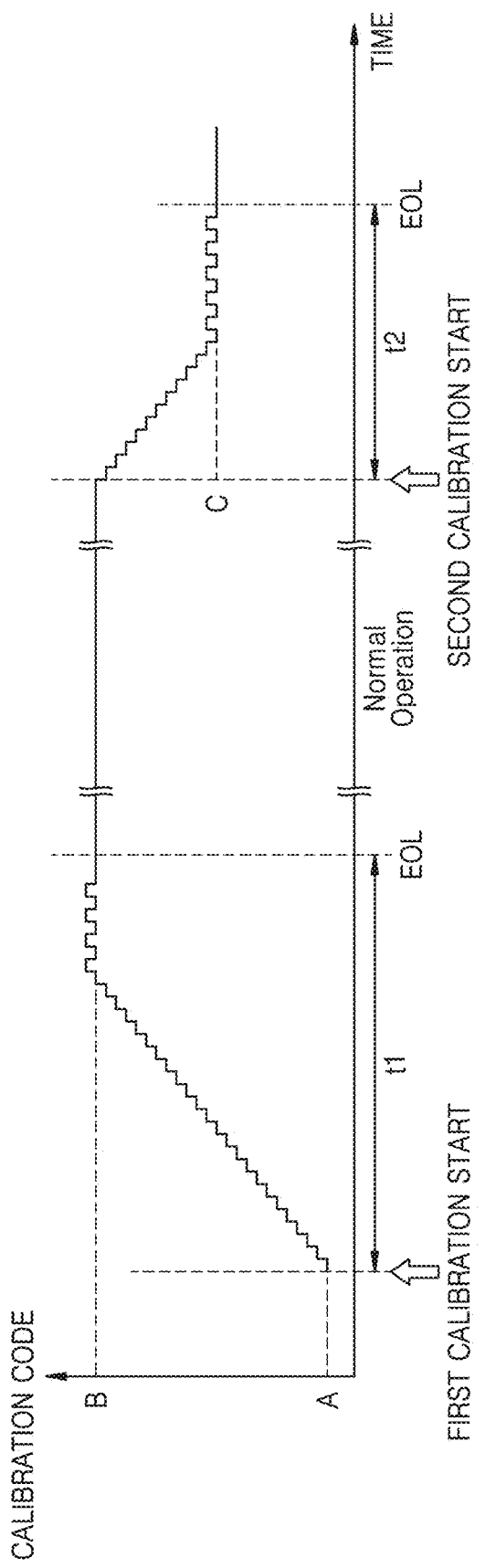
FIG. 4A is a graph for explaining a method of performing calibration in a memory device.

FIG. 4A is a graph for explaining a method of performing calibration in a memory device. The redundant description is omitted.

The memory device may start calibration in a predetermined or alternatively, desired reset code in response to receiving an impedance calibration start signal. The reset code is a code that does not take into account P data, V data, and T data. According to example embodiments, the memory device may determine the target calibration code of the previous calibration as the start calibration code in the next calibration. The memory device may generate a start calibration code by the code generator and transmit the same to the pull-down/up set circuit. The code generator may accumulate and receive a calibration code increase signal or a calibration code decrease signal from the comparator and may search for a target calibration code. It may take a lot of time to search for the target calibration code because it is necessary to find the target calibration code by sequentially increasing or decreasing the calibration code starting with a fixed reset code.

Referring to FIG. 4A, in the first calibration, the memory device starts impedance calibration in the reset calibration code A, and the code generator may sequentially increase the calibration code in response to sequentially receiving calibration code increase signals from the comparator. The memory device recognizes that the calibration code is toggled and may determine a value B as the target calibration code in response to receiving a calibration termination signal (that is, the end of locking (EOL)). The memory device may perform a general operation after the end of the first calibration. Thereafter, in the second calibration, the memory device may determine the start calibration code as B, which is the existing target calibration code. The code generator may sequentially reduce the calibration code in response to sequentially receiving the calibration code decrease signal from the comparator. The memory device may recognize that the calibration code is toggled and determine a value C as the target calibration code in response to receiving the calibration termination signal (that is, the EOL).

Figure 4B:
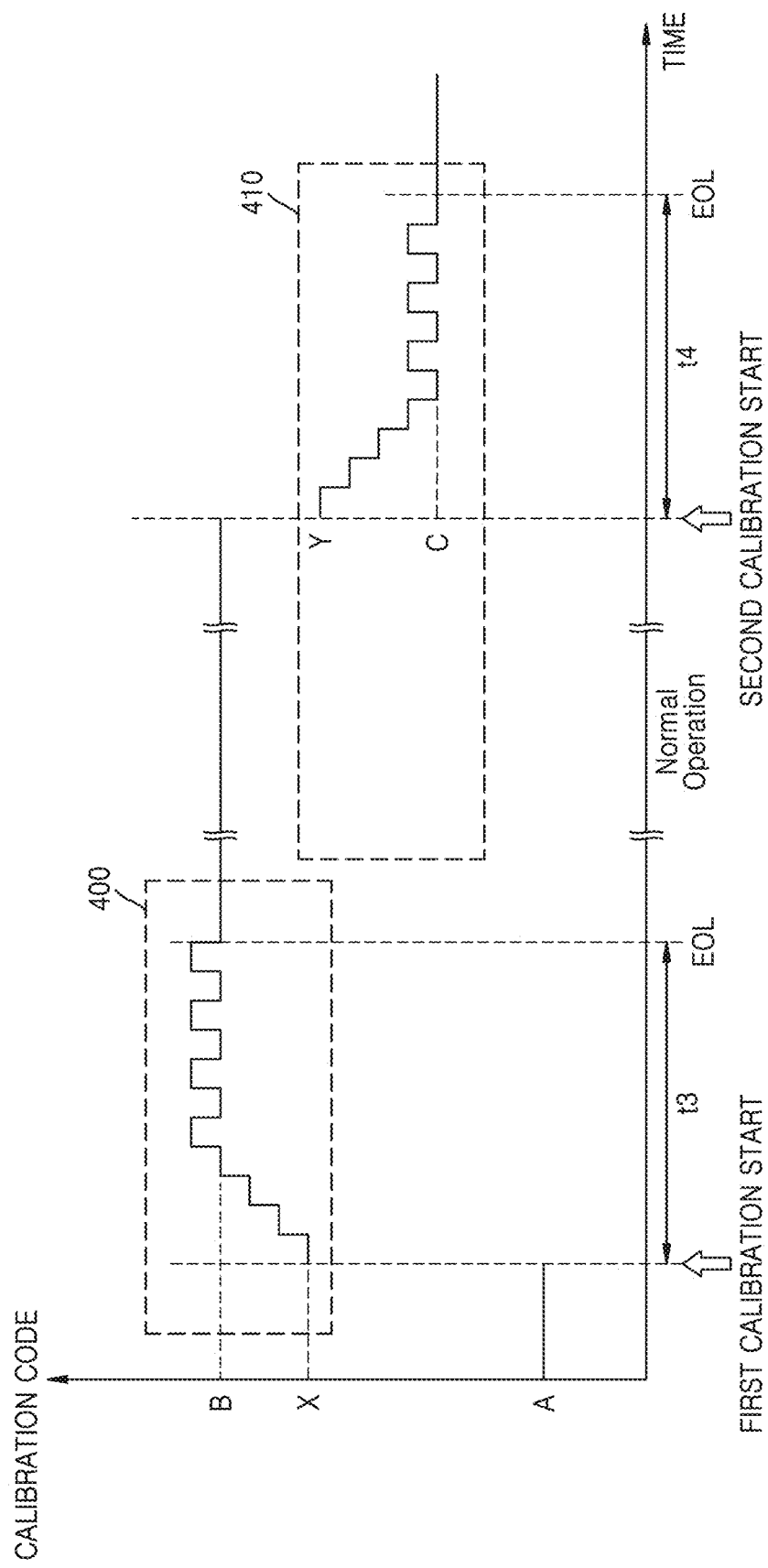
FIG. 4B is a timing diagram illustrating a method of performing calibration in a memory device, according to example embodiments of the inventive concepts.

FIG. 4B is a timing diagram illustrating a method of performing calibration in a memory device, according to example embodiments of the inventive concepts.

Referring to FIG. 4B, the code generator may receive code data for a start calibration code from the T2C converter in response to receiving an impedance calibration start signal. Based on the look-up table, the T2C converter may set code ranges 400 and 410 that are determined to have a target calibration code and determine a calibration code within the code ranges 400 and 410 as a start calibration code. For example, the T2C converter may determine a value X within the first code range 400 as a start calibration code. The code generator may generate the start calibration code X to perform the first calibration. The memory device may determine the target calibration code B through a calibration process. Compared to the method described with reference to FIG. 4A, it may be seen that the time taken for the first calibration is much shorter (t1>t3).

The memory device may perform the second calibration in the same manner. Unlike the method described with reference to FIG. 4A using the target calibration code at the first calibration as the start value, the code generator of the present specification may generate a start calibration code based on code data for a start calibration code from the T2C converter. The code generator may determine Y as the start calibration code and perform the second calibration. The T2C converter may set a code range 410 corresponding to the changed T data and V data. The T2C converter may determine a value Y within the changed code range 410 as a start calibration code. Compared to the method described with reference to FIG. 4B, it can be seen that the time taken for the second calibration is much shorter (t2>t4).

FIG. 5 illustrates a look-up table stored in a T2C converter according to example embodiments of the inventive concepts.

According to example embodiments, the T2C converter may store a plurality of look-up tables corresponding to various pieces of P data. Different calibration codes may be mapped to the same V data and T data in each look-up table. For example, the calibration code mapped to the first VT data in the first look-up table corresponding to the first P data may be different from the calibration code mapped to the second VT data in the second look-up table corresponding to the second P data. The T2C converter may select one of a plurality of look-up tables corresponding to a fusing input from the outside.

The look-up table may include a calibration code mapped in a one-to-one correspondence to any combination of V data and T data. Referring to FIG. 5, when the V data is $V_{OH}=V_{DDQ}\times\frac{1}{3}$, a combination of the T data and the calibration code may be the same as (000, 010), (001, 011), (010, 101), and (011, 110). When the V data is $V_{OH}=V_{DDQ}\times\frac{1}{2}$, a combination of the T data and the calibration code may be the same as (000, 010), (001, 011), (010, 101), and (011, 110). Values of the P, V, T data shown in FIG. 5 and the calibration codes corresponding thereto are example values, but the example embodiments are not limited thereto.

When the calibration is completed and the target calibration code is determined, the T2C converter may transmit the target calibration code to the code generator. The T2C converter may receive the target calibration code and update the look-up table. For example, when V data and T data are ($V_{OH}=V_{DDQ}\times\frac{1}{2}$, 001), the calibration code value of 011 is stored in the look-up table, but when the target calibration code is determined to be 010, in the result of performing actual calibration, the T2C converter may input 010 to the look-up table. The T2C converter may generate a sophisticated look-up table through such learning.

According to example embodiments, when the difference between the calibration code in the look-up table and the target calibration code is out of a predetermined or alternatively, desired range, the T2C converter may determine that an error has occurred in the currently determined P data. For example, if a memory chip is aged or physically damaged, the P data may change. The T2C converter may replace a look-up table currently in use with a look-up table corresponding to other P data based on an external input.

Figure 6A:
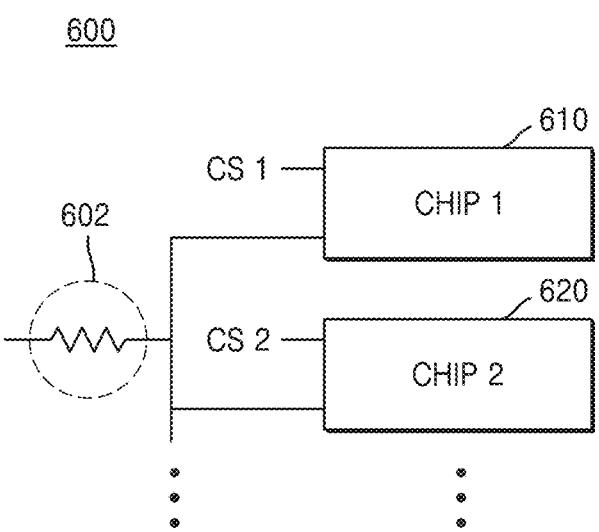
FIG. 6A is a diagram for explaining that a plurality of chips included in a memory device share one reference resistor according to example embodiments of the inventive concepts.

FIG. 6A is a diagram for explaining that a plurality of chips included in a memory device share one reference resistor according to example embodiments of the inventive concepts.

A memory device 600 may include a plurality of memory chips that share one reference resistor 602. According to example embodiments, each memory chip may have different P, V, and T data. Accordingly, the memory device 600 may perform impedance calibration on each of the plurality of memory chips. According to example embodiments, the memory device 600 may sequentially perform impedance calibration on each memory chip. For example, the memory device 600 may perform impedance calibration on a second chip 620 after the impedance calibration on a first chip 610 is completed.

Each memory chip may perform impedance calibration based on receiving a chip select signal CS. For example, the first chip 610 may perform impedance calibration in response to receiving the first chip selection signal CS1, and the second chip 620 may perform impedance calibration in response to receiving the second chip selection signal CS2. According to example embodiments, one of the plurality of chips may be selected as a master chip, and when a chip selection signal CS for the master chip is applied to the master chip, the master chip may sequentially apply chip selection signals CS to the other chips.

Figure 6B:
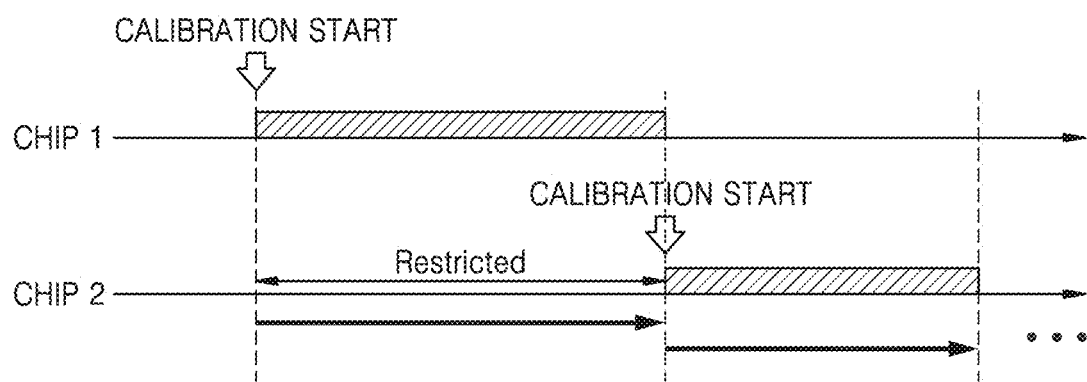
FIG. 6B is a diagram for explaining that a memory device sequentially performs calibration between a plurality of chips according to example embodiments of the inventive concepts.

FIG. 6B is a diagram for explaining that a memory device sequentially performs calibration between a plurality of chips according to example embodiment of the inventive concepts.

Referring to FIG. 6B, after impedance calibration is performed on the first chip, impedance calibration may be performed on the second chip. Impedance calibration on the second chip may not start while impedance calibration on the first chip is performed.

According to an aspect of the inventive concepts, there is provided a memory device including a T2C converter configured to obtain temperature data from a temperature sensor, to obtain specification voltage data from an MRW module, to determine a calibration code corresponding to the obtained temperature and specification voltage data based on a stored look-up table, and to transmit code data including information about the determined calibration code to a code generator, the code generator to transmit the generated calibration code to a pull-down/up set circuit, based on the code data received from the T2C converter, the pull-down/up set circuit to determine opening and closing of a plurality of transistors to correspond to the calibration code received from the code generator, and to form a pull-down/up impedance, and a comparator configured to compare a magnitude of a first input voltage determined by the pull-down/up impedance and the impedance of an on-die termination (ODT) circuit with a magnitude of a second input voltage generated by a voltage generator and transmit a calibration code change signal to the code generator based on a result of the voltage comparison.

According to example embodiments, the code generator may increase or decrease the current calibration code by the unit code and transmit the changed calibration code to the pull-down/up set circuit in response to receiving a calibration code change signal from the comparator.

According to example embodiments, the comparator may transmit a calibration code decrease signal to the code generator when the first input voltage is greater than the second input voltage, as a result of the comparison of the first input voltage with the second input voltage, and may transmit a calibration code increase signal to the code generator when the second input voltage is greater than the first input voltage, as a result of the comparison of the first input voltage with the second input voltage.

According to example embodiments, the code generator may determine the current calibration code as the target calibration code without transmitting the current calibration code to the pull-down/up set circuit when the determined calibration code is toggled for more than a predetermined or alternatively, desired time.

According to example embodiments, the code generator transmits the determined target calibration code to the T2C converter, and the T2C converter may modify the look-up table based on the target calibration code.

According to example embodiments, the T2C converter may acquire updated temperature data and specification voltage data from the temperature sensor and the MRW module every predetermined or alternatively, desired cycle, and transmit, to the code generator, code data for a calibration code corresponding to the updated temperature data and the specification voltage data on the basis of the look-up table.

According to example embodiments, the T2C converter may generate the look-up table by simulating the process variation data, specification voltage data, and temperature data of the memory device.

According to example embodiments, the look-up table may include a calibration code corresponding on a one-on-one basis to any combination of process variation data, specification voltage data, and temperature data.

According to example embodiments, the T2C converter may include a plurality of look-up tables corresponding to a plurality of pieces of process variation data in a one-to-one correspondence, and may select one look-up table from among the plurality of look-up tables based on process variation of the memory device.

According to example embodiments, the memory device includes a plurality of memory chips, and the memory device may perform calibration on each of the plurality of memory chips sequentially.

According to another aspect of the inventive concepts, there is provided a memory device including a T2C converter configured to acquire temperature data and specification voltage data from a temperature sensor and an MRW module, respectively, a comparator configured to receive an input voltage from an on-die termination (ODT) circuit and a pull-down/up set circuit, configured to receive a power source voltage, and an input voltage from a voltage generator, and a calibration control circuit electrically connected to the T2C converter and the comparator, wherein the calibration control circuit may be configured to generate a start calibration code by using a look-up table stored in the T2C converter, determine whether to open and close a plurality of transistors included in the pull-down/up set circuit to correspond to the start calibration code, and determine an increase or a decrease of the calibration code by using the comparator.

According to example embodiments, the calibration control circuit may receive the first input voltage that is obtained by dividing the power source voltage by the on-die termination circuit impedance and the pull-down/up set circuit impedance, receive the second input voltage from the voltage generator, and compare magnitudes of the first input voltage and the second input voltage by using the comparator.

According to example embodiments, the calibration control circuit may decrease the calibration code when the first input voltage is greater than the second input voltage, and increase the calibration code when the second input voltage is greater than the first input voltage.

According to example embodiments, the calibration control circuit may obtain temperature data and specification voltage data from the temperature sensor and the MRW module every predetermined or alternatively, desired cycle, and generate a start calibration code based on the look-up table.

According to example embodiments, the calibration control circuit may determine the current calibration code as the target calibration code when the calibration code is toggled for more than a predetermined or alternatively, desired time.

Figure 7:
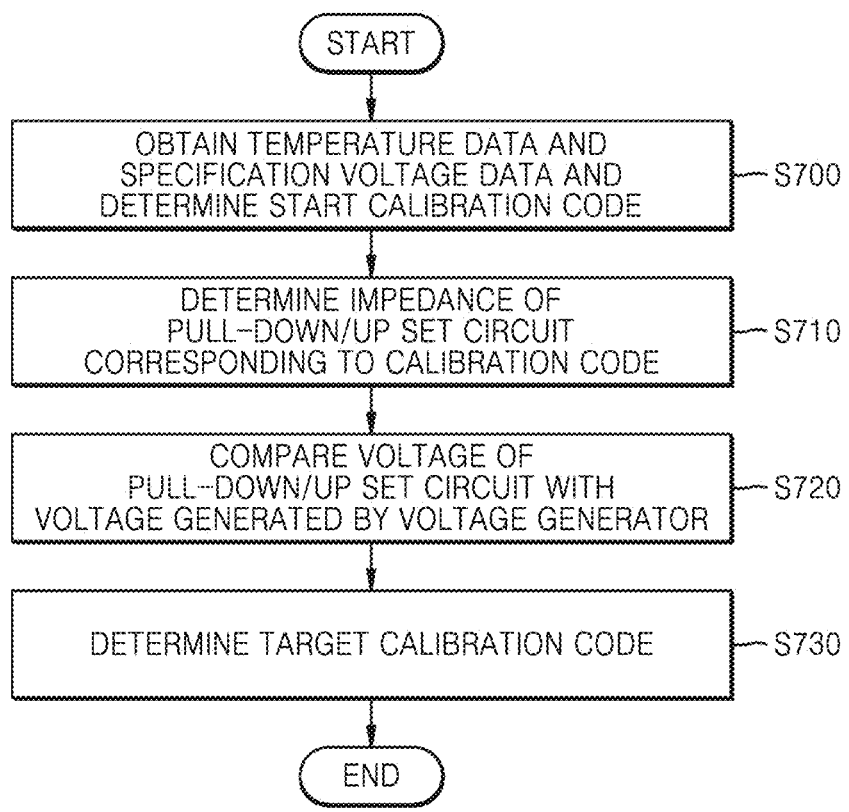
FIG. 7 is a flowchart illustrating a method of performing calibration by a memory device using a look-up table, according to example embodiments of the inventive concepts.

FIG. 7 is a flowchart illustrating a method of performing calibration by a memory device using a look-up table, according to example embodiments of the inventive concepts.

In operation S700, the memory device may obtain the temperature data and the specification voltage data and determine a start calibration code. The T2C converter may receive temperature data generated by the temperature sensor and specification voltage data generated by the MRW module. The T2C converter may determine a start calibration code near the target calibration code by considering the current P, V, and T data based on the stored look-up table. The T2C converter may transmit code data for the determined start calibration code to the code generator.

In operation S710, the memory device may determine an impedance of the pull-down/up set circuit corresponding to the calibration code. The code generator may generate a calibration code corresponding to the code data and transmit the generated calibration code to the pull-down/up set circuit. The calibration code may be a signal indicating opening and closing of the plurality of transistors included in the pull-down/up set circuit. The pull-down/up set circuit may receive the calibration code and change the opening/closing states of the plurality of transistors. The pull-down/up set circuit may include a plurality of transistors connected in parallel with each other, and the impedance of the pull-down/up set circuit may be a sum of the impedance of the turned-on transistor.

In operation S720, the memory device may compare a voltage divided by the pull-down/up set circuit with the voltage generated by the voltage generator. The comparator may receive the first input voltage and the second input voltage. The first input voltage may be a voltage which is obtained by dividing the power source voltage by using the on-die termination circuit and the pull-down/up set circuit, and the second input voltage may be a specification voltage generated by the voltage generator. The comparator may compare the magnitude of the first input voltage with the magnitude of the second input voltage and transmit the comparison result to the code generator. The comparator may transmit a calibration code decrease signal to the code generator when the first input voltage is greater than the second input voltage, and may transmit a calibration code increase signal to the code generator when the second input voltage is greater than the first input voltage.

In operation S730, the memory device may determine a target calibration code based on the voltage comparison result in operation S720. The code generator may change the calibration code transmitted to the pull-down/up set circuit in response to receiving the calibration increase signal or calibration decrease signal. The code generator may determine the target calibration code and transmit the target calibration code to the output terminal. According to example embodiments, the code generator may transmit the target calibration code to the T2C converter so that the T2C converter updates the look-up table.

Figure 8:
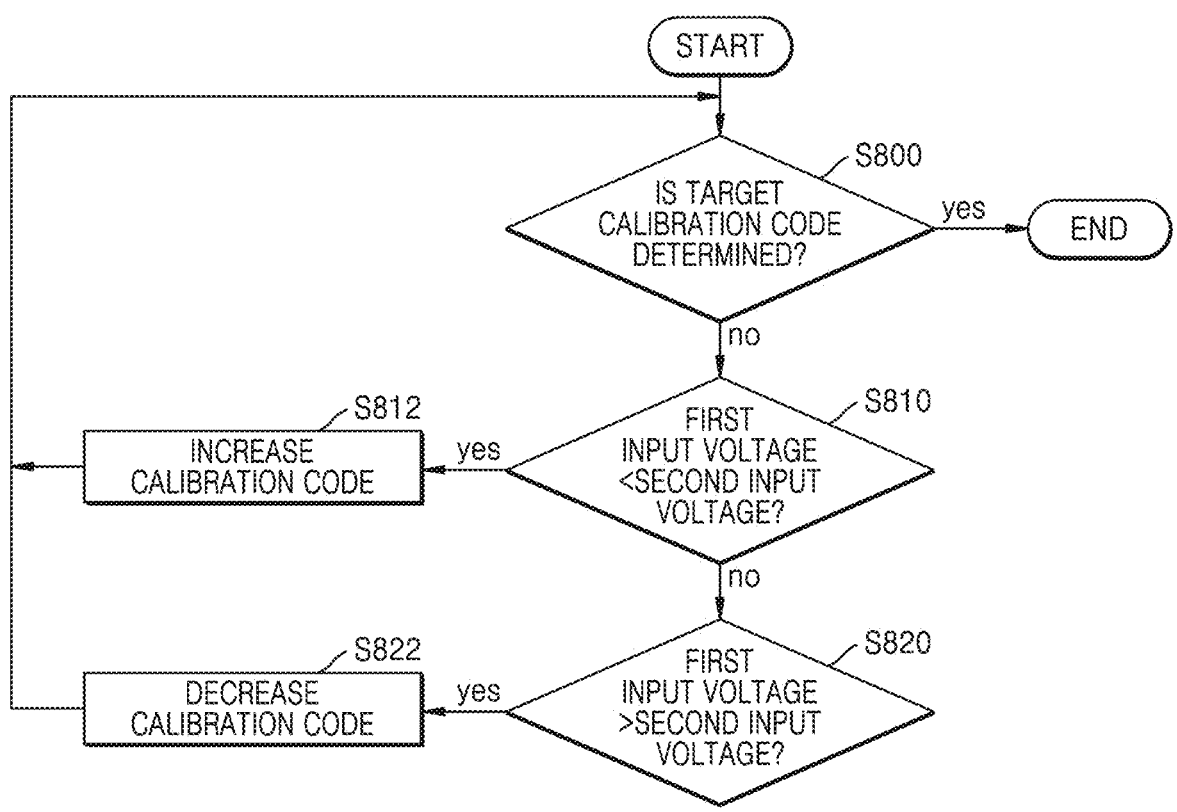
FIG. 8 is a flowchart illustrating a method of determining a target calibration code by comparing two input voltages in a comparator of a memory device, according to example embodiments of the inventive concepts.

FIG. 8 is a flowchart illustrating a method of determining a target calibration code by comparing two input voltages in a comparator of a memory device, according to example embodiments of the inventive concepts.

In operation S800, the memory device may determine whether to determine the target calibration code. The code generator may determine the current calibration code as the target calibration code when the calibration code increase signal or calibration code decrease signal received from the comparator alternately is more than a predetermined or alternatively, desired number of times. The code generator accumulates and stores the calibration code increase signal or calibration code decrease signal received from the comparator and may determine whether the target calibration code determination conditions are met. When the target calibration code determination condition is satisfied, the memory device may determine the current calibration code as the target calibration code and terminate the operation. When the target calibration code determination condition is not satisfied, the memory device may transmit the current calibration code to the pull-down/up set circuit.

In operations S810 and S820, the memory device may compare the first input voltage with the second input voltage, which are input to the comparator. In operation S812, when the second input voltage is greater than the first input voltage, the comparator may transmit the calibration code increase signal to the code generator. In operation S822, when the first input voltage is greater than the second input voltage, the comparator may transmit the calibration code reduction signal to the code generator.

According to another aspect of the inventive concepts, there is provided a calibration method using a memory device including a T2C converter, the calibration method including acquiring temperature data, acquiring specification voltage data, and determining, by the T2C converter, a calibration code corresponding to the obtained temperature and specification voltage data based on a stored look-up table, transmitting code data including information on the determined calibration code to a code generator, generating a calibration code by the code generator and transmitting the generated calibration code to a pull-down/up set circuit, determining opening and closing of a plurality of transistors to correspond to the calibration code in the pull-down/up set circuit to form a pull-down/up impedance, and comparing a magnitude of a first input voltage determined by the pull-down/up impedance and the impedance of an on-die termination (ODT) circuit with a magnitude of a second input voltage generated by a voltage generator and transmitting a calibration code change signal to the code generator based on a result of the voltage comparison.

According to example embodiments, the generating and transmitting of the calibration code to the pull-down/up set circuit may include increasing or decreasing the current calibration code by the unit code in response to receiving the calibration code change signal, and transmitting the changed calibration code to the pull-down/up set circuit.

According to example embodiments, the generating of the calibration code and transmitting the calibration code to the pull-down/up set circuit may include: transmitting a calibration code decrease signal to the code generator when the first input voltage is greater than the second input voltage as a result of comparing the first input voltage with the second input voltage; and transmitting a calibration code increase signal to the code generator when the second input voltage is greater than the first input voltage as a result of comparing the first input voltage with the second input voltage.

According to example embodiments, when the calibration code is toggled for more than a predetermined or alternatively, desired time, the calibration method may further include determining the current calibration code as the target calibration code without transmitting the current calibration code to the pull-down/up set circuit.

According to example embodiments, the transmitting of the code data to the code generator may include obtaining updated temperature data and specification voltage data from the temperature sensor and the MRW module every predetermined or alternatively, desired cycle and transmitting, to the code generator, code data for a calibration code corresponding to the updated temperature data and specification voltage data, based on the look-up table.

FIG. 9 is a block diagram illustrating a system 3000 including a memory device including a device for performing a calibration method according to example embodiments of the inventive concepts.

Referring to FIG. 9, the system 3000 may include a camera 3100, a display 3200, an audio processing unit 3300, a modem 3400, DRAMs 3500a and 3500b, flash memories device 3600a and 3600b, I/O devices 3700a and 3700b, and an AP 3800. The system 3000 may be implemented as a laptop computer, a mobile phone, a smartphone, a tablet PC, a wearable device, a healthcare device, or an Internet Of Things (IOT) (device. In addition, the system 3000 may be implemented as a server or a PC.

The camera 3100 may shoot a stop image or video data under control by a user, and store and transmit the captured image/video data stored to the display 3200. The audio processor 3300 may process audio data included in the flash memory devices 3600a and 3600b or content of a network. The modem 3400 may modulate and transmit signals for wired/wireless data transmission and reception, and demodulate the signals to recover to the original signal at a receiving side. The I/O devices 3700a and 3700b may include devices that provide digital input and/or output functions such as a Universal Serial Bus (USB) or storage, digital cameras, Secure Digital (SD) cards, a Digital Versatile Disc (DVD), a network adapter, a touch screen, etc.

The AP 3800 may control the overall operation of the system 3000. The AP 3800 may control the display 3200 so that some of the content stored in the flash memory devices 3600a and 3600b is displayed on the display 3200. When a user input is received through the I/O devices 3700a and 3700b, the AP 3800 may perform a control operation corresponding to the user input. The AP 3800 may include a controller 3810 and an interface 3830, and is provided with an accelerator block, which is a dedicated circuit for Artificial Intelligence (AI) data calculation, or an accelerator chip 3820 separately from the AP 3800. The DRAM 3500b may be additionally mounted on the accelerator block or the accelerator chip 3820. The accelerator is a function block that specializes in performing specific functions of the AP 3800, and the accelerator may include a GPU, which is a function block that specializes in graphic data processing, a Natural Processing Unit (NPU), which is a block for specializing in AI calculation and Inference, and a Data Processing Unit (DPU), which is a block that specializes in data transmission.

The system 3000 may include a plurality of DRAMs 3500a and 3500b. The AP 3800 may control DRAMs 3500a and 3500b through command and mode register (MRS) settings that meet the Joint Electron Device Engineering Council (JEDEC) standards, or may configure a DRAM interface protocol for communication with DRAMs in order to use company-specific functions such as low voltage/high speed/reliability, and Cyclic Redundancy Check (CRC)/Error Correction Code (ECC) functions. For example, the AP 3800 may communicate with the DRAM 3500a through an interface that meets JEDEC standards such as LPDDR4, LPDDR5, and the like, and the accelerator block or accelerator chip 3820 may configure a new DRAM interface protocol for communication with the DRAMs, in order to control the DRAM 3500b for accelerators with higher bandwidth than the DRAM 3500a.

Although FIG. 9 shows only DRAMs 3500a and 3500b, any memory such as PRAM, SRAM, MRAM, RRAM, FRAM, or hybrid RAM may be used if the bandwidth, reaction speed, and voltage conditions of the AP 3800 or the accelerator block or accelerator chip 3820 are satisfied. The DRAMs 3500a and 3500b have a latency and a bandwidth that are relatively less than the I/O devices 3700a and 3700b or the flash memory devices 3600a and 3600b. The DRAMs 3500a and 3500b are initialized at the power-on time point of the system 3000, and used as a temporary storage place of the operating system and the application data when the operating system and the application data are loaded, or used as an execution space of various pieces of software code.

Within DRAMs 3500a and 3500b, the four fundamental arithmetic operations such as addition/subtraction/multiplication/division, vector operations, address operations, or Fast Fourier Transform (FFT) operations may be performed. In addition, within the DRAMs 3500a and 3500b, functions for performance used for inference may be performed. Here, the inference may be performed in a deep learning algorithm using an artificial neural network. Deep learning algorithms may include a training operation of learning a model through a variety of data and an inference operation of recognizing data with a learned model. In example embodiments, an image taken by a user through the camera 3100 is signal-processed and stored in the DRAM 3500b, and the accelerator block or accelerator chip 3820 may perform an AI data calculation that recognizes data using data and functions used for inference, which are stored in the DRAM 3500b.

The system 3000 may include storages or flash memories device 3600a and 3600b having a capacity greater than the DRAMs 3500a and 3500b. The accelerator block or accelerator chip 3820 may perform training operations and AI data calculations using the flash memory devices 3600a and 3600b. In example embodiments, the flash memories 3620 may perform training operations and inference AI data calculations performed by the AP 3800 and/or the accelerator block or accelerator chip 3820 more efficiently using an operation device provided in the memory controller 3610. The flash memories device 3600a and 3600b may store photos taken through the camera 3100 or may store data transmitted to the data network. For example, augmented reality/virtual reality, high definition (HD), or ultra-high definition (UHD) content may be stored.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A memory device comprising:
a temperature to code (T2C) converter configured to obtain temperature data from a temperature sensor, to obtain specification voltage data from a mode register write (MRW) module, configured to determine a calibration code corresponding to the obtained temperature data and the obtained specification voltage data based on a stored look-up table, and configured to transmit code data including information about the determined calibration code to a code generator;

the code generator configured to transmit the determined calibration code to a pull-down/up set circuit, based on the code data received from the T2C converter;

the pull-down/up set circuit configured to determine opening and closing of a plurality of transistors to correspond to the determined calibration code received from the code generator, and configured to form a pull-down/up impedance; and a comparator configured to compare a magnitude of a first input voltage determined by the pull-down/up impedance and an impedance of an on-die termination (ODT) circuit with a magnitude of a second input voltage generated by a voltage generator and configured to transmit a calibration code change signal to the code generator based on a result of the voltage comparison.

2. The memory device of claim 1, wherein, in response to receiving the calibration code change signal from the comparator, the code generator is configured to increase or decrease a current calibration code by a unit code and is configured to transmit the increased or decreased calibration code to the pull-down/up set circuit.

3. The memory device of claim 2, wherein, when the first input voltage is greater than the second input voltage as a result of the comparison between the first input voltage and the second input voltage, the comparator is configured to transmit a calibration code decrease signal to the code generator, and when the second input voltage is greater than the first input voltage as a result of the comparison between the first input voltage and the second input voltage, the comparator is configured to transmit a calibration code increase signal to the code generator.

4. The memory device of claim 3, wherein, when the determined calibration code is toggled for a predetermined time or more, the code generator is configured to determine the current calibration code as a target calibration code without transmitting the current calibration code to the pull-down/up set circuit.

5. The memory device of claim 4, wherein the code generator is configured to transmit the determined target calibration code to the T2C converter, and the T2C converter is configured to modify the stored look-up table based on the determined target calibration code.

6. The memory device of claim 1, wherein the T2C converter is configured to obtain updated temperature data and updated specification voltage data from the temperature sensor and the MRW module every predetermined cycle, and is configured to transmit the code data for a calibration code corresponding to the updated temperature data and the updated specification voltage data to the code generator based on the stored look-up table.

7. The memory device of claim 1, wherein the T2C converter is configured to generate the stored look-up table by simulating process variation data, specification voltage data, and temperature data of the memory device.

8. The memory device of claim 7, wherein the stored look-up table comprises a calibration code corresponding to any combination of process variation data, specification voltage data, and temperature data in one-to-one correspondence.

9. The memory device of claim 7, wherein the stored look-up table of the T2C converter comprises a plurality of look-up tables corresponding to a plurality of pieces of process variation data in one-to-one correspondence, and is configured to select one look-up table from among the plurality of look-up tables based on process variation of the memory device.

10. The memory device of claim 1, wherein the memory device comprises a plurality of memory chips, and the memory device is configured to sequentially perform calibration of each of the plurality of memory chips.

11. A memory device comprising:

a temperature to code (T2C) converter configured to acquire temperature data and specification voltage data from a temperature sensor and a mode register write (MRW) module, respectively;

a comparator configured to receive an input voltage from an on-die termination (ODT) circuit and a pull-down/up set circuit, which receive a power source voltage, and an input voltage from a voltage generator; and a calibration control circuit electrically connected to the T2C converter and the comparator, wherein the calibration control circuit is configured to:

generate a start calibration code by using a look-up table stored in the T2C converter;

determine whether to open and close a plurality of transistors included in the pull-down/up set circuit to correspond to the start calibration code; and determine an increase or a decrease of a calibration code by using the comparator.

12. The memory device of claim 11, wherein the calibration control circuit is configured to:

receive a first input voltage in which the power source voltage is distributed by an impedance of the on-die termination circuit and an impedance of the pull-down/up set circuit by using the comparator; receive a second input voltage from the voltage generator; and compare a magnitude of the first input voltage with a magnitude of the second input voltage.

13. The memory device of claim 12, wherein the calibration control circuit is configured to: decrease the calibration code when the first input voltage is greater than the second input voltage; and increase the calibration code when the second input voltage is greater than the first input voltage.

14. The memory device of claim 11, wherein the calibration control circuit is configured to:

obtain temperature data and specification voltage data at each predetermined period from the temperature sensor and the MRW module; and generate the start calibration code based on the look-up table in response to changes in the temperature data and the specification voltage data.

15. The memory device of claim 11, wherein the calibration control circuit is configured to determine a current calibration code as a target calibration code when the calibration code toggles for a predetermined time or more.

16. A calibration method using a memory device including a temperature to code (T2C) converter, the calibration method comprising:

acquiring temperature data, acquiring specification voltage data, and determining, by the T2C converter, a calibration code corresponding to the acquired temperature data and the acquired specification voltage data based on a stored look-up table;

transmitting code data including information on the determined calibration code to a code generator;

generating the calibration code by the code generator and transmitting the generated calibration code to a pull-down/up set circuit;

determining opening and closing of a plurality of transistors to correspond to the generated calibration code in the pull-down/up set circuit to form a pull-down/up impedance; and comparing a magnitude of a first input voltage determined by the pull-down/up impedance and an impedance of an on-die termination (ODT) circuit with a magnitude of a second input voltage generated by a voltage generator and transmitting a calibration code change signal to the code generator based on a result of the voltage comparison.

17. The calibration method of claim 16, wherein the generating the calibration code and transmitting the generated calibration code to the pull-down/up set circuit is configured to: in response to receiving the calibration code change signal, increase or decrease a current calibration code by a unit code; and transmit the increased or decreased calibration code to the pull-down/up set circuit.

18. The calibration method of claim 17, wherein the generating the calibration code and the transmitting the generated calibration code to the pull-down/up set circuit is configured to:

transmit a calibration code decrease signal to the code generator; in response to the first input voltage being greater than the second input voltage as a result of the comparison between the first input voltage and the second input voltage; and transmit a calibration code increase signal to the code generator, in response to the second input voltage being greater than the first input voltage as a result of the comparison between the first input voltage and the second input voltage.

19. The calibration method of claim 18, further comprising: determining the current calibration code as a target calibration code without transmitting the current calibration code to the pull-down/up set circuit, in response to the calibration code being toggled for a predetermined time or more.

20. The calibration method of claim 16, wherein the transmitting of the code data to the code generator comprises: obtaining updated temperature data and updated specification voltage data from the temperature sensor and a mode register write (MRW) module every predetermined cycle; and transmitting updated code data for an updated calibration code corresponding to the updated temperature data and the updated specification voltage data to the code generator based on the stored look-up table.

* * * * *